United States Patent
Chen et al.

(10) Patent No.: US 6,268,225 B1
(45) Date of Patent: Jul. 31, 2001

(54) FABRICATION METHOD FOR INTEGRATED PASSIVE COMPONENT

(75) Inventors: Lung-hsin Chen; Chun-chieh Chen, both of Hsinchu (TW)

(73) Assignee: Viking Technology Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/353,393

(22) Filed: Jul. 15, 1999

(51) Int. Cl.[7] .............................. G01R 31/25; H01L 21/66
(52) U.S. Cl. .............................. 438/15; 438/106; 438/455
(58) Field of Search .................................. 438/106, 125, 438/627, 107, 108, 14, 15, 455; 257/536

(56) References Cited

U.S. PATENT DOCUMENTS

| | | | |
|---|---|---|---|
| 5,098,528 | * | 3/1992 | DeLalande et al. . |
| 5,495,387 | * | 2/1996 | Mandai et al. . |
| 6,021,050 | * | 2/2000 | Ehman et al. . |
| 6,083,766 | * | 7/2000 | Chen . |

* cited by examiner

Primary Examiner—Kevin M. Picardat
Assistant Examiner—D. M. Collins
(74) Attorney, Agent, or Firm—Bacon & Thomas

(57) ABSTRACT

The present invention relates to a fabrication method for integrated passive component, comprising the steps of providing an insulator substrate and then planarizing the insulator substrate; forming integrated passive components on the insulator substrate; and packaging the integrated passive components by a thick film packaging method. The advantages of the method of the invention are that the fabricated components are miniaturized, the yield is high, and cost of production is low.

15 Claims, 6 Drawing Sheets

FABRICATION METHOD FOR INTEGRATED PASSIVE COMPONENT

BACKGROUND OF THE INVENTION a) Technical Field of the Invention

The present invention relates to a fabrication method of thin film integrated passive component with ceramic or glass materials as substrate, and to a method of thick film packaging technique of the fabricated components.

b) Description of the Prior Art

In recent years, with the widespread application of SMT technology, passive components are made into chips. Currently, thin film method and thick film method are used to form chipped integrated passive components.

U.S. Pat. No. 5,495,387 issued to Mandai et al. discloses a RC array fabricated by thick film method. As shown in FIG. 1 of the US patent, the RC array comprises a thin laminated block 11. Two capacitor electrodes opposite to each other are formed in the interior of this block.

The block 11 is fired at a temperature of 1,200° C. to 1,300° C. to provide a sintered body in order to form the ceramic block 11. On the ceramic surface 12 of the ceramic block 11, a first terminal electrode 15, a second terminal electrode 16, a ground terminal electrode 17 and a plurality of resistors 18 are formed, and the first terminal electrode 15 is connected to a terminal electrode of each capacitor, and one terminal of the individual resistor 18 is connected to the first terminal electrode 15, and the other terminal of the resistor 18 is connected to the second terminal electrode 16. The other electrodes of the individual capacitor are co-connected to the ground terminal electrode 17. The RC array is formed from the above mentioned capacitors, the plurality of resistors 18, the first terminal electrode 15, the second terminal electrode 16 and the ground electrode 17. Finally, the RC array is packaged by means of thick film packaging technology to complete the fabrication of a thick film RC integrated component The advantage of the above RC array is that the cost of production is low. The drawbacks of the fabrication method are (i) the obtained products are not stable for the reason that the process requires high sintering temperature of above 1,000° C.; (ii) other problems exist in combination of various materials, and (iii) the size of the elements is not easy to miniaturize.

U.S. Pat. No. 5,355,014, issued to Rao, et al. discloses a method of fabricating RC integrated component by employing thin film fabricating technique, wherein conventional semiconductor fabrication technology is used to form a RC network having Schottky Diode on a silicon substrate, and then the product is packaged by IC packaging technique. Normally, this conventional technique comprises the steps of wafer polishing, wafer-chip cutting, chips mounting, wire bonding, sealing, marking, lead finish, trim/form, and packaging.

The advantages of this conventional fabricating method are (i) the RC integrated component is smaller in size, and (ii) the yield is high. However, the disadvantage is that the cost of this type of product is much higher than the similar thick film integrated passive component.

This is due to the complicated process of thin film packaging. Thus, the cost of this type of component is high.

SUMMARY OF THE INVENTION

Accordingly, it is an object of the present invention to provide a fabrication method for integrated passive components and the packaging method thereof by thick film packaging technique.

The fabrication method for integrated passive component in accordance with the present invention comprises the steps of providing an insulator substrate and then planarizing the insulator substrate; forming integrated passive components on the insulator substrate; and packaging the integrated passive components by a thick film packaging method.

(a) forming a substrate by using ceramic or glass materials and reducing the surface roughness of the ceramic or glass substrate by polishing or enameling;

(b) forming the required integrated passive components using the method of thinfilm process on ceramic or glass substrate, the integrated passive components including RC array components, LC array components, and RLC array components; and (c) packaging the integrated passive components using thick film packaging method to obtain the product of an integrated passive components.

In accordance with the present invention, the fabricated passive components are miniaturized, the yield is high, and the cost of production is low.

BRIEF DESCRIPTION OF THE DRAWINGS

The foregoing and other objects and advantages of the invention will become apparent in reading the following detailed description and with reference to the following drawings, in which:

FIGS. 3B' to 3C' show the sequence of fabrication process, and FIG. 3D' illustrates the perspective view of the fabricated chip of the present invention;

DETAILED DESCRIPTION OF THE PREFERRED EMBODIMENT

Figure 1:
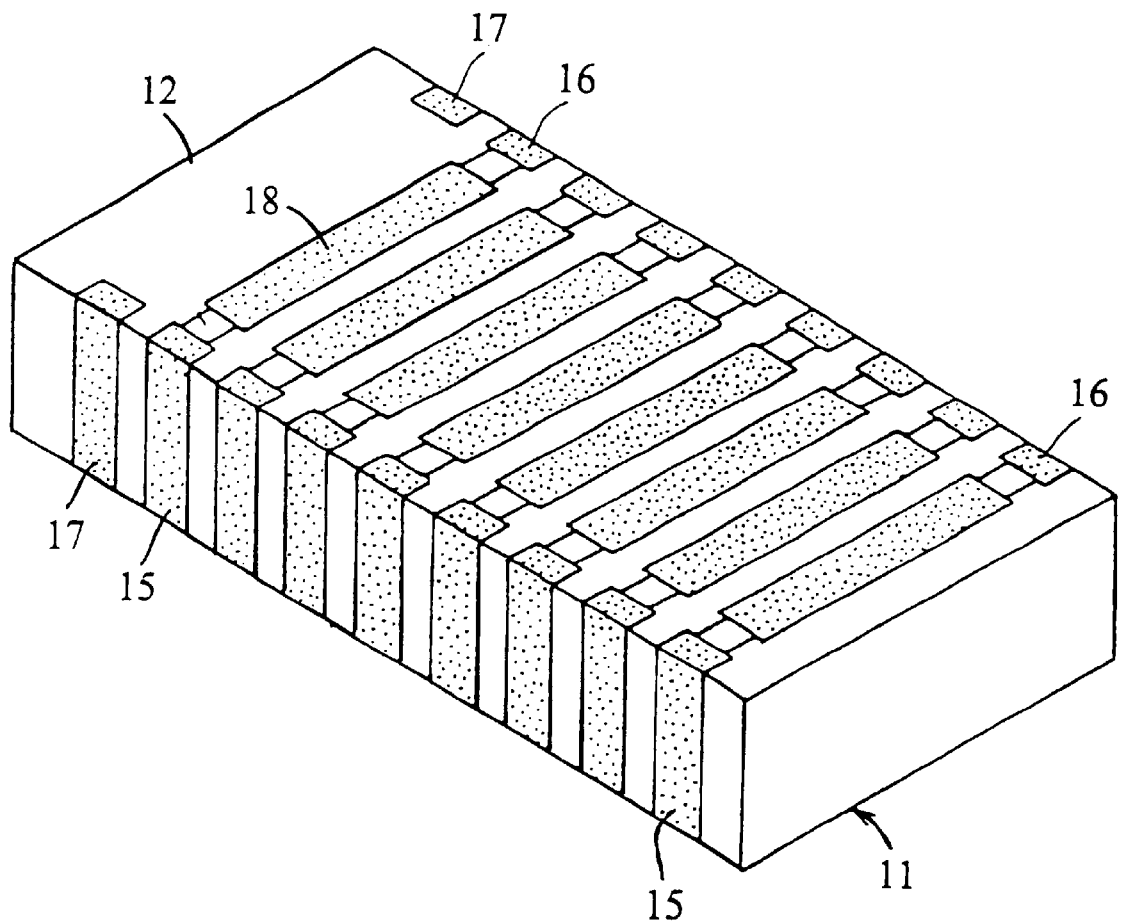
FIG. 1 shows a RC array fabricated by thick film process in accordance with the present invention.
Figure 2:
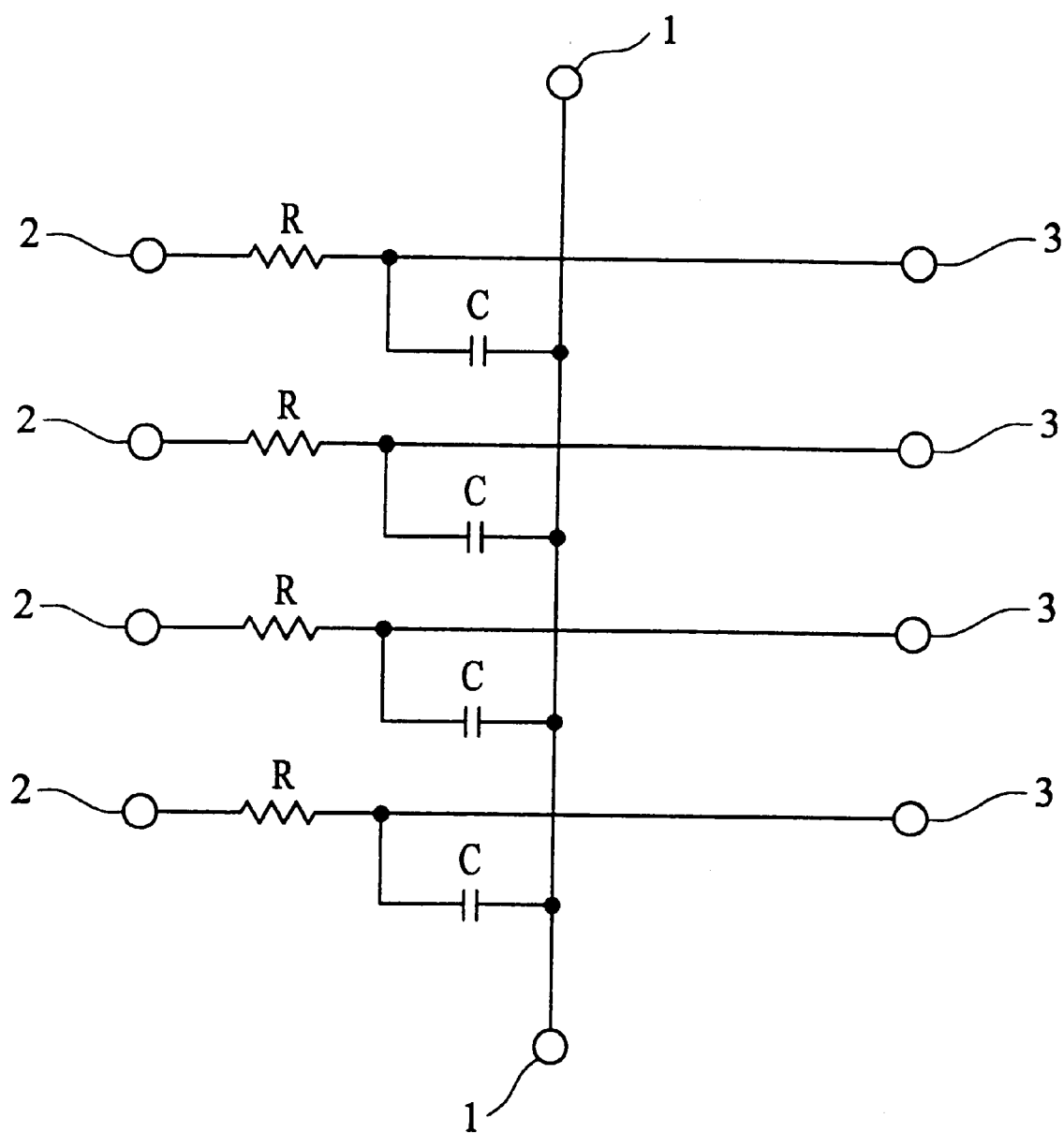
FIG. 2 shows a circuit diagram of the RC array of the preferred embodiment in accordance with the present invention.

FIG. 2 shows a circuit diagram of a RC array of the preferred embodiment in accordance with the present invention. FIG. 2 illustrates an L-shaped circuit structure having four circuit branches with resistors R and capacitors C connected in series. In FIG. 2, the knot points 1, 2 and 3 are respectively connected to the ground, a first electrode terminal and a second electrode terminal. FIGS. 3A to FIGS. 3D are sectional views of the RC array of FIG. 2, illustrating the sequence of the fabrication process, and FIGS. 3B' to 3C' are top views of the RC array of FIG. 2, illustrating the sequence of the fabrication process. FIG. 3D' illustrates the perspective view of the fabricated chip, and FIG. 4 is a schematic view illustrating the position of the respective resistor R and capacitor C.

In accordance with the present invention, a ceramic or glass substrate 10 of thickness ranging from 0.3 to 1.2 mm is used to replace the conventional silicon substrate for the reason that the strength of ceramic or glass materials is greater than that of the silicon. This has an advantage in respect of the subsequent packaging process. For example, $Al_2O_3$, or AlN materials is employed as the ceramic substrate, and ordinary glass or quartz is used as the glass substrate. After that, the process of enameling or polishing is employed to reduce the surface roughness of the ceramic or the glass substrate.

Figure 3A:
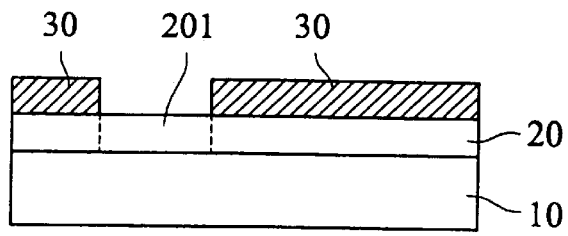
FIGS. 3A to 3D show the sequence of fabrication process, in accordance with the present invention.
Figure 4:
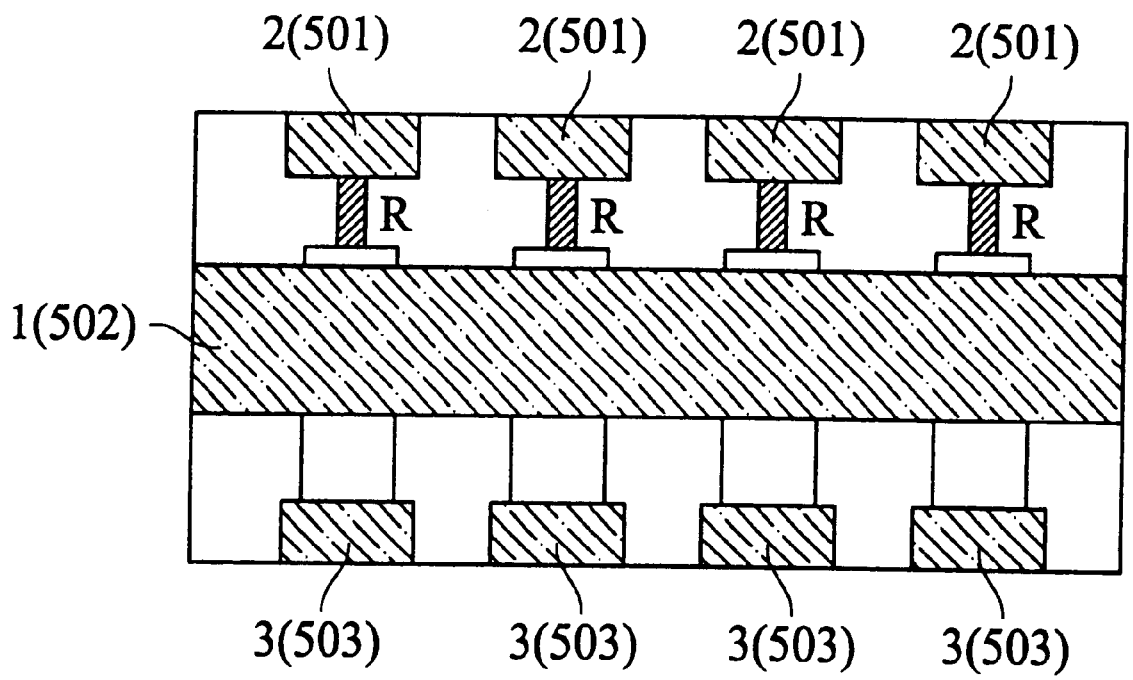
FIG. 4 is a schematic view showing the position of the respective resistor R and the capacitor C.

Then, as shown in FIG. 3A, on the entire surface of the ceramic or the glass substrate, using sputtering or evaporation method to form a resistor layer 20 of thickness about 200 Å to 2,000 Å, and the materials used are $TaN_x$, $TaAl_x$, and NiCr. After that, on the resistor layer 20, using sputtering or evaporation method to form the first metallic conductive layer 30 of thickness about 500 Å to 3,000 Å. Then, the process of photolithography and etching are employed to etch the metallic conductive layer 30 to obtain a pattern on the first metallic conductive layer 30, which is shown in FIG. 3A, wherein the reference numeral 201 is the exposed resistor region. Next, a photo-mask is used on the resistor region 201 to proceed with the photolithography and etching process to form the required resistor pattern. In the preferred embodiment, the obtained resistor pattern is a strip shape resistor R, which is shown in FIG. 4.

Figure 3B:
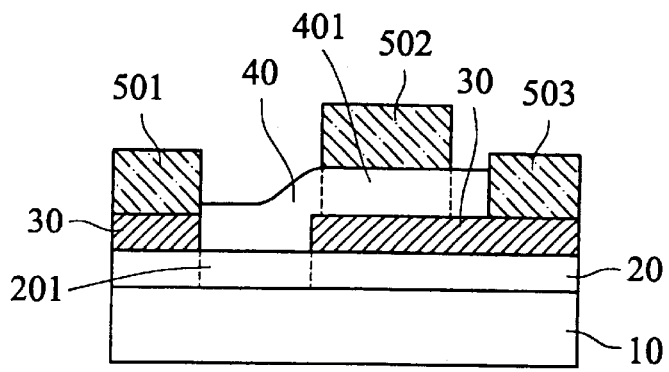

Next, as shown in FIG. 3B, the entire surface is formed, using the sputtering or Chemical Vapor Deposition (CVD) into a dielectric layer 40 of thickness about 340 Å to 3,000 Å, which is used as the dielectric layer for capacitor, wherein the materials used are $Ta_2O_5$, $SiO_2$ or $Al_2O_3$. Then, by means of photolithography and etching process, a pattern for the dielectric layer is etched.

Next, using sputtering or evaporation method, the entire surface is formed into a second metallic conductive layer 50, wherein good conductivity materials, such as Al and Cu are employed. Then, by means of photolithography and etching technique to form the pattern as shown in FIG. 3B, wherein, the region 501 corresponds to the first electrode terminal, the region 502 corresponds to the ground terminal, the region 503 corresponds to the second electrode terminal, and the regions 502, 503 and the effective region 401 of the dielectric layer, which is positioned directly below the region 502, together form the capacitor C. At this moment, the top view is shown in FIG. 3B'. Then, the chip is annealed within the temperature of 400° C. to 500° C. for 20 minutes to reduce the stress.

At this instance, the respective resistors R, the capacitors C, ground terminals, the first electrode terminal, the second electrode terminal and the wiring thereof are formed.

Next, laser trim technique is employed to trim the resistor value on the chip, so as to trim the resistor value upward until the required precise accuracy is obtained.

Then, the electrical properties of the resistor and the capacitor on the chip are measured. Next, the obtained chips are packaged using thick film packaging method.

Figure 3C:
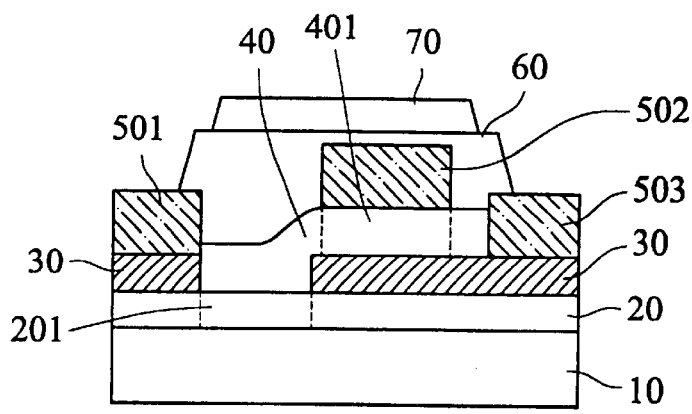
Figure 3D:
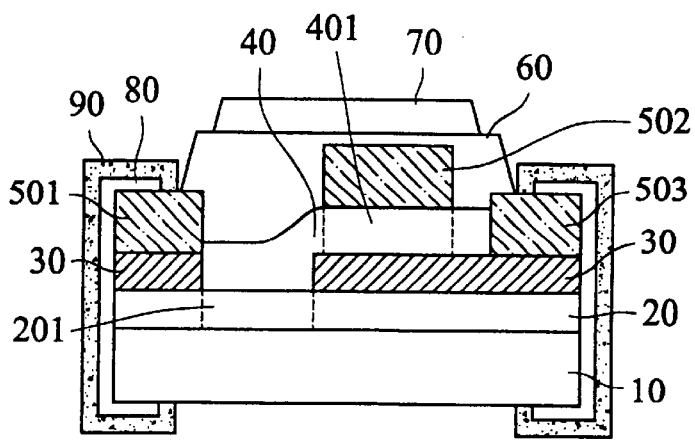
Figure 3B:
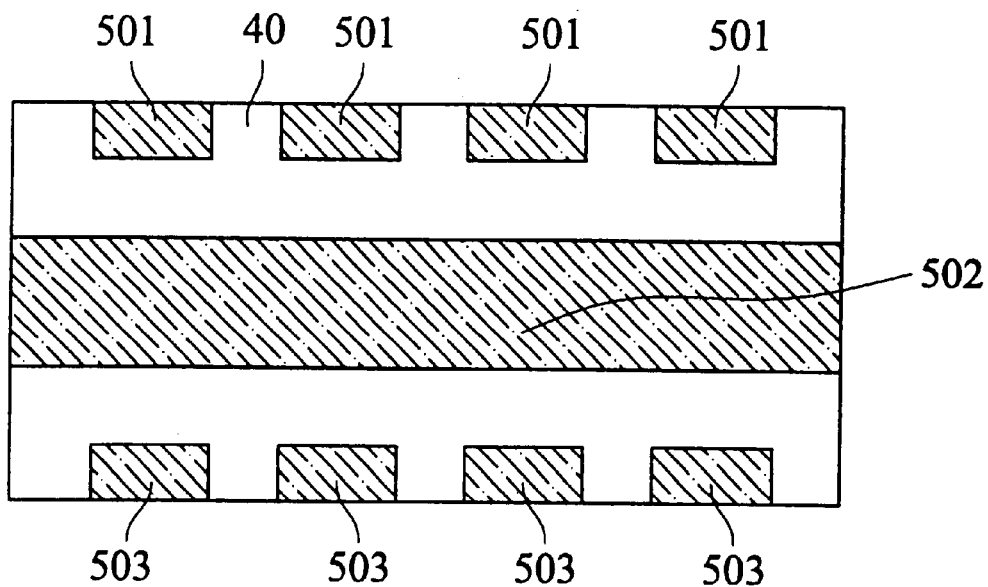
Figure 3C:
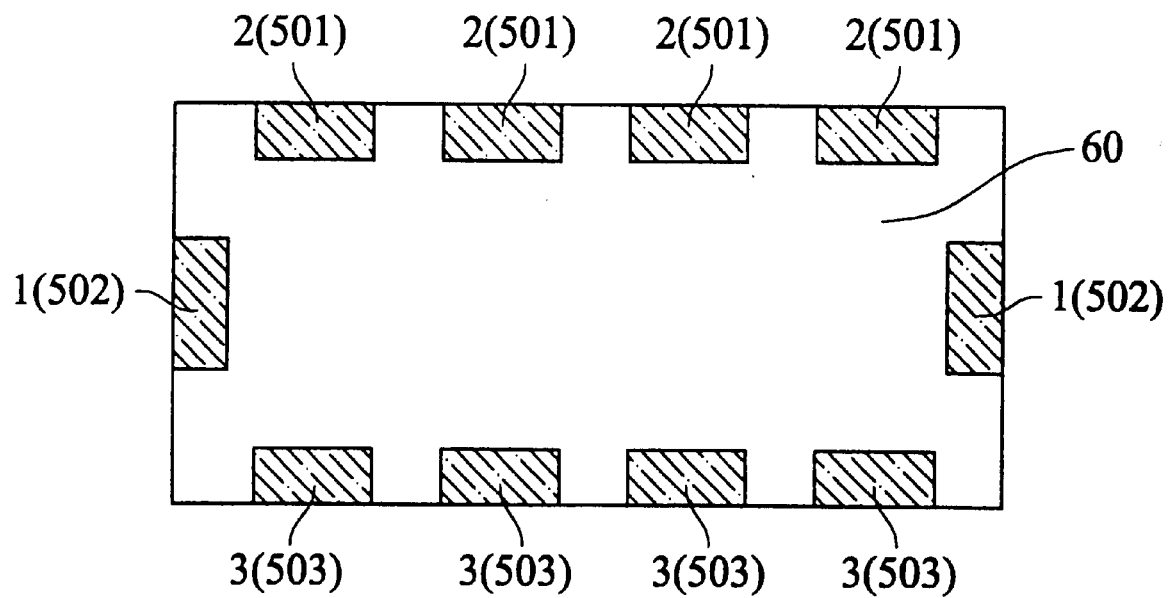
Figure 3D:
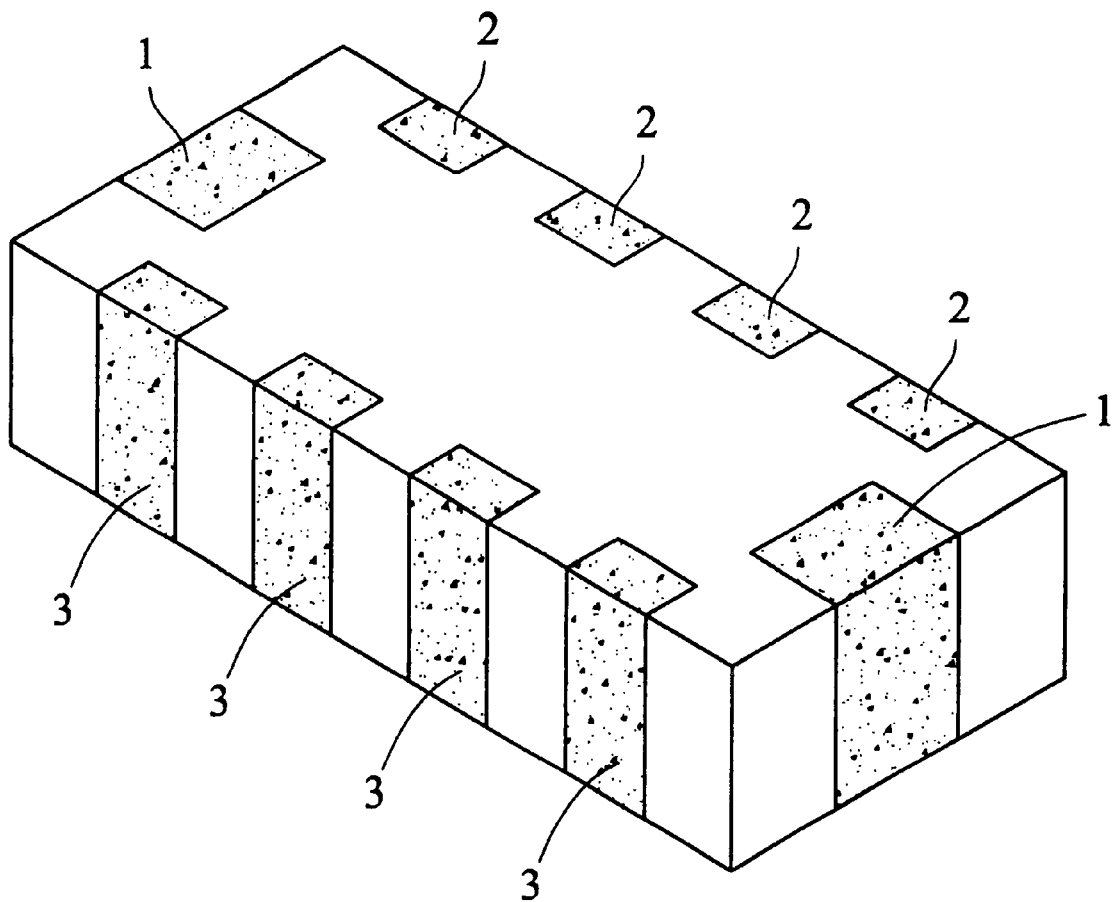

As shown in FIG. 3C, screen printing technique is employed, wherein a passivation layer 60 formed from resin or glass materials is printed onto the chip surface of the chip. At this instance, the top view is shown in FIG. 3C', wherein, other than the two ground terminals, four first electrode terminals, and four second electrode terminals, the other regions of the surface are covered by the passivation layer 60. Next, a drying step at the temperature of about 200° C. is employed.

The two ground terminals correspond to the knot points 1 of FIG. 2. The four first electrode terminals correspond to the knot points 2, and the four second electrode terminals correspond to the knot points 3. These knot points are the leading terminals of the chip.

Next, employing the similar screen printing technique, the passivation layer 60 is printed with a marking layer 70, illustrating the parameters of the elements. This word layer 70 is then undergone a low temperature drying treatment at about 200° C.

After the marking layer 70 is dried, the chips undergo a dicing process, including a two time breaking process. The first breaking is to break the chips into strip, and the second breaking is to break the individual chip of each RC array.

Next, as shown in FIG. 3D, dipping technique is used to fabricate the terminal electrode 80. The terminal electrode 80 consists of silver. The terminal electrodes are respectively connected to the lead terminal of the chips, and are extended from the top surface of the chip via the individual lateral face to the bottom face of the chip. After that, the components are cured at a temperature below 260° C.

Next, a layer of metal 90 like Cu/Ni/Su—Pb or Ni/Su—Pb is coated (by electro-plating) to the terminal electrode in order to obtain soldering properties for subsequent SMT process. Thus, L-type RC array is obtained, and the lateral view of the chip is shown in FIG. 3D'.

Finally, the properties of the resistors and capacitors of the fabricated products are tested and the products are then packaged.

The above describes the whole fabrication process of an L-type integrated RC component. The fabrication process of other types of RC element, such as π-type integrated RC component, is similar to that of the L-type integrated RC component but the pattern in the individual process is different Although the invention has been described in detail with respect to specific embodiments, various modifications can be made without departing from the scope the invention. For instance, the above mentioned fabrication method can be employed in the fabrication of LC (inductor and capacitor) integrated component. The difference between the present fabrication method and the fabrication of LC integrated component is that a resistor layer 20 is not required in the LC integrated component but the inductor pattern has to be directly formed on the metallic conductive layer 30. In other example, the above method can also be employed to fabricate RCL (resistor, capacitors and inductor) integrated component. In the process of fabricating RCL integrated component, the required inductor pattern is formed on the metal conductive layer 30.

What is claimed is:

1. A fabrication method for integrated RC components, comprising the steps of:
   (a) providing an insulator substrate and then planarizing said insulator substrate;
   (b) forming integrated RC components on said insulator substrate, comprising the steps of:
      (b-1) forming a resistor layer and a first metallic conductive layer on said insulator substrate by sputtering or evaporation, and then patterning said resistor layer and said first metallic conductive layer by photolithography;
      (b-2) forming a dielectric layer on said first metallic conductive layer by sputtering or chemical vapor deposition, and then patterning said dielectric layer by photolithography; and
      (b-3) forming a second metallic conductive layer on said dielectric layer by sputtering or evaporation, and then patterning said second metallic conductive layer by photolithography; and
   (c) packaging said integrated RC components by a thick film packaging method, comprising the steps of:
      (c-1) printing a passivation layer on said integrated RC components by a screen printing technique, and then drying said passivation layer;

(c-2) printing a marking layer on said passivation layer by a screen printing technique, and then drying said marking layer;

(c-3) breaking said integrated RC components into individual integrated RC component;

(c-4) forming silver terminal electrodes on said individual integrated RC component, and then drying said silver terminal electrodes; and (c-5) electro-plating said silver terminal electrodes.

2. The fabrication method as set forth in claim 1, wherein the step (b) further comprises the steps of:

(b-4) annealing said second metallic conductive layer to reduce stress therein;

(b-5) laser trimming said resistor layer to obtain a required resistor value; and (b-6) electrically measuring electrical properties of said integrated RC components.

3. The fabrication method as set forth in claim 2, wherein the step of planarizing said insulator substrate is by enameling or polishing.

4. The fabrication method as set forth in claim 1, wherein said insulator substrate comprises $Al_2O_3$ or AlN.

5. The fabrication method as set forth in claim 4, wherein said insulator substrate is made of ordinary glass or quartz glass.

6. A fabrication method for integrated LC components, comprising the steps of:

(a) providing an insulator substrate and then planarizing said insulator substrate;

(b) forming integrated LC components on said insulator substrate, comprising the steps of:

(b-1) forming a first metallic conductive layer on said insulator substrate by sputtering or evaporation, and then patterning said first metallic conductive layer by photolithography;

(b-2) forming a dielectric layer on said first metallic conductive layer by sputtering or chemical vapor deposition, and then patterning said dielectric layer by photolithography; and (b-3) forming a second metallic conductive layer on said dielectric layer by sputtering or evaporation, and then patterning said second metallic conductive layer by photolithography; and (c) packaging said integrated RC components by a thick film packaging method, comprising the steps of:

(c-1) printing a passivation layer on said integrated LC components by a screen printing technique, and then drying said passivation layer;

(c-2) printing a marking layer on said passivation layer by a screen printing technique, and then drying said marking layer;

(c-3) breaking said integrated LC components into individual integrated LC component;

(c-4) forming silver terminal electrodes on individual integrated LC component, and then drying said silver terminal electrodes; and (c-5) electro-plating said silver terminal electrodes.

7. The fabrication method as set forth in claim 6, wherein the step (b) further comprises the steps of:

(b-4) annealing said second metallic conductive layer to reduce stress therein;

(b-5) laser trimming said resistor layer to obtain a required resistor value; and (b-6) electrically measuring electrical properties of said integrated LC components.

8. The fabrication method as set forth in claim 7, wherein the step of planarizing said insulator substrate is by enameling or polishing.

9. The fabrication method as set forth in claim 8, wherein said insulator substrate comprises $Al_2O_3$ or AlN.

10. The fabrication method as set forth in claim 8, wherein said insulator substrate is made of ordinary glass or quartz glass.

11. A fabrication method for integrated RLC components, comprising the steps of:

(a) providing an insulator substrate and then planarizing said insulator substrate;

(b) forming integrated RLC components on said insulator substrate, comprising the steps of:

(b-1) forming a resistor layer and a first metallic conductive layer on said insulator substrate by sputtering or evaporation, and then patterning said resistor layer and said first metallic conductive layer by photolithography;

(b-2) forming a dielectric layer on said first metallic conductive layer by sputtering or chemical vapor deposition, and then patterning said dielectric layer by photolithography; and (b-3) forming a second metallic conductive layer on said dielectric layer by sputtering or evaporation, and then patterning said second metallic conductive layer by photolithography; and (c) packaging said integrated RLC components by a thick film packaging method, comprising the steps of:

(c-1) printing a passivation layer on said integrated RLC components by a screen printing technique, and then drying said passivation layer;

(c-2) printing a marking layer on said passivation layer by a screen printing technique, and then drying said marking layer;

(c-3) breaking said integrated RLC components into individual integrated RLC component;

(c-4) forming silver terminal electrodes on said individual integrated RLC component, and then drying said silver terminal electrodes; and (c-5) electro-plating said silver terminal electrodes.

12. The fabrication method as set forth in claim 11, wherein the step (b) further comprising the steps of (b-4) annealing said second metallic conductive layer to reduce stress therein;

(b-5) laser trimming said resistor layer to obtain a required resistor value; and (b-6) electrically measuring electrical properties of said integrated RLC components.

13. The fabrication method as set forth in claim 12, wherein the step of planarizing said insulator substrate is by enameling or polishing.

14. The fabrication method as set forth in claim 13, wherein said insulator substrate comprises $Al_2O_3$ or AlN.

15. The fabrication method as set forth in claim 13, wherein said insulator substrate is made of ordinary glass or quartz glass.

\* \* \* \* \*